UNITED STATES PATENT OFFICE.

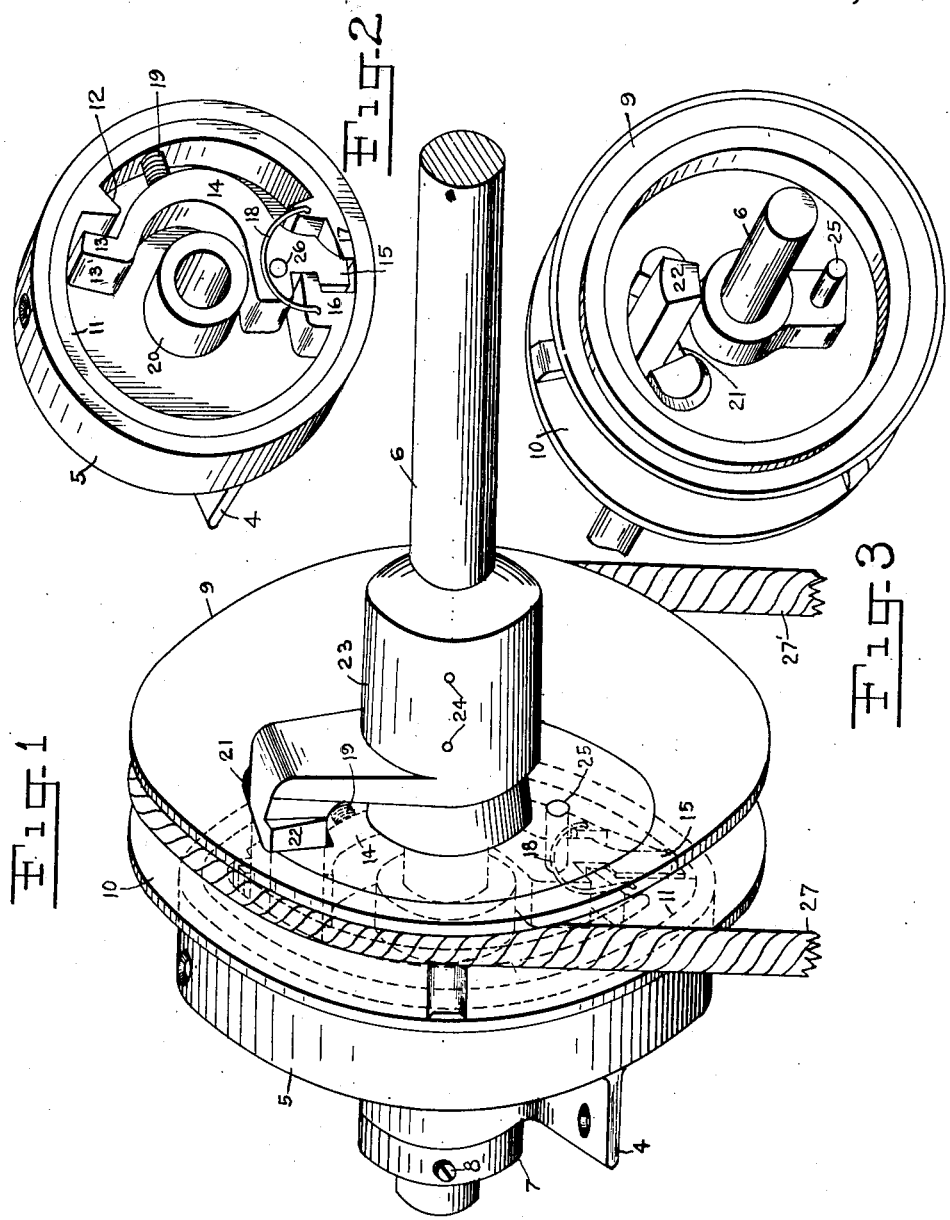

ALBIN SWENSON, OF NEW YORK, N. Y.

AUTOMATIC BRAKE.

1,342,699.  Specification of Letters Patent.  Patented June 8, 1920.

Application filed August 23, 1918. Serial No. 251,051.

*To all whom it may concern:*

Be it known that I, ALBIN SWENSON, a subject of the King of Sweden, residing at New York city, in the county of New York and State of New York, have invented certain new and useful Improvements in Automatic Brakes, of which the following is a specification, reference being had therein to the accompanying drawing.

My invention relates to improvements in automatic braking mechanism and more particularly has reference to and is illustrated in the accompanying drawings in its application to the pulley mechanism of a dumbwaiter.

Figure 1 illustrates in perspective a suitable form of suspension pulley for a dumbwaiter. Fig. 2 is a similar view upon a reduced scale illustrating the interior construction of one part of said pulley mechanism, and Fig. 3 is a similar view illustrating other parts of said mechanism.

4 indicates a suitable hanger for suspending the casing 5 through which the shaft 6 projects as shown, and 7 is a collar secured by the pin 8 to the shaft 6 for holding the parts in position. 9 indicates the pulley having a V-shaped periphery as indicated at 10 over which the dumbwaiter rope passes. Within the casing 5 it will be observed is provided an expansion ring 11 having a projection 12 in the path of the projection 13 of the lever 14 which said lever has another projection 15 between the ends 16—17 of said expansion band 11 said ends being connected by a suitable spring such as 18 and the end 13 of said lever 14 being projected clear of the projection 12 by a suitable spring such as 19. 20 indicates the shank of the casing 5 through which the shaft 6 projects.

The pulley 9 it will be observed is cut away at 21 to allow the projecting member 22 from the sleeve 23 to pass therethrough, said sleeve 23 being secured to the shaft 6 by the pins 24, and the inside of the grooved pulley 9 it will be observed is provided with a projecting pin 25 the free end of which it will be observed when the mechanism is in position engages the hole 26 in the lever 14. From the foregoing it will be observed that the rotation of the shaft 6 counter clockwise would bring the member 22 against the left hand end of the slot 21 in the pulley. This would tend to move the pin 25, and thus swing the lever 14 in a direction to compress the spring 19, which would permit the ends of the brake band to approach each other and thus move freely in the casing 5. Discontinuance of the movement of the shaft 6 would permit the load to slightly reverse the pulley moving pin 25 to the left, and spreading the ends of the band to lock the load. In lowering, the shaft 6 would be rotated clockwise, member 22 engaging face 13' to compress the spring 19, and thus release the band.

Of course it will be understood that various modifications may be made in the construction and arrangement of parts without departing from the spirit of the invention as claimed.

I claim:

In a mechanism of the class described, a pulley and a fixed casing substantially parallel therewith, a band brake within said fixed casing and a lever pivoted to said pulley within said band brake, a projection secured upon said shaft extending through said pulley and adapted to engage one end of said lever, the other end of said lever being adapted to operate between the free ends of said band brake.

In testimony whereof I hereunto affix my signature in the presence of two witnesses.

ALBIN SWENSON.

Witnesses:
 DAVID H. DOUGLASS,
 THOMAS A. HILL.